United States Patent
Sprague

[19]

[11] Patent Number: 5,967,585
[45] Date of Patent: Oct. 19, 1999

[54] RETROFITTABLE KICK PANEL FOR A VEHICLE

[75] Inventor: Carl E. Sprague, Fullerton, Calif.

[73] Assignee: Custom Autosound Mfg., Inc., Anaheim, Calif.

[21] Appl. No.: 09/073,654

[22] Filed: May 6, 1998

[51] Int. Cl.$^6$ .................................................. B60R 13/01
[52] U.S. Cl. .......................... 296/39.1; 181/199; 381/86; 454/143
[58] Field of Search ................................. 296/39.1, 208; 181/199; 381/86; 454/143

[56] References Cited

U.S. PATENT DOCUMENTS

| | | | |
|---|---|---|---|
| 4,085,289 | 4/1978 | Schmideler | 181/199 X |
| 4,161,995 | 7/1979 | Pohlmann et al. | 181/199 X |
| 4,277,653 | 7/1981 | Pawelzick | 381/86 X |
| 4,550,796 | 11/1985 | Tomita | 381/86 X |

FOREIGN PATENT DOCUMENTS

| | | | |
|---|---|---|---|
| 479547 | 12/1951 | Canada | 181/199 |
| 55-96790 | 7/1980 | Japan | 381/86 |

*Primary Examiner*—D. Glenn Dayoan
*Assistant Examiner*—Chad Wells
*Attorney, Agent, or Firm*—Thomas I. Rozsa; Tony D. Chen; Jerry Fong

[57] ABSTRACT

A retrofittable kick panel to be installed over the insulation of the inner walls under the dashboard of an automobile to form a suitable acoustic chamber for audio speakers. It includes a plate like base member having a raised portion with a central opening therethrough which opening is surrounded by a mounting rim for mounting of a audio speaker. Adjacent to the raised portion are a plurality of louvers to providing fresh air access to the passenger seats and the floor location of the automobile. In use, the base member is installed over the side wall insulation and fresh air duct under the dashboard of an automobile, forming an acoustic chamber which will receive the audio speaker. Wiring is routed to the chamber from one audio channel of the radio or other audio equipment and to an audio speaker which is then mounted on the annular rim after the removal of any felt installation material that would interfere with the speaker's magnet.

22 Claims, 3 Drawing Sheets

RETROFITTABLE KICK PANEL FOR A VEHICLE

BACKGROUND OF THE INVENTION

1. Field of the Invention

The present invention generally relates to the field of kick panels for a vehicle. More particularly, the present invention relates to the field of kick panels for the mounting of large, high quality speakers in vehicles.

2. Description of the Prior Art

The installation of speakers in automobiles is well known in the prior art and oftentimes the speakers are mounted in the kick panels adjacent to the legs of the driver and front seat passenger. In general the purpose of kick panels is to provide a finished surface for the portion of the walls of the passenger compartment in the area under the dashboard. Usually such panels are made of hardboard or heavy resilient plastic in order to withstand the occasional impact of passengers' shoes. Another purpose of kick panels is to provide a covering for a layer of heavy fiber insulation that provides sound deadening to protect the passengers from sounds from outside the automobile. Such soundproofing material is usually about one inch thick and fills the cavity created by the kick panel and the outside wall or front fender.

Another purpose which kick panels serve is to provide a mounting surface for fresh air vents. Automobile manufacturers have traditionally found it convenient to mount a fresh air vent in the upper portion of a kick panel. The vents are usually simple grills attached to the kick panel. Fresh air is fed to the back of the grill by way of an air duct that fits into a channel cut into the one inch layer of insulation between the panel and the outside wall of the automobile.

It has been a common practice for an owner of an automobile who wishes to improve his sound system to install new speakers in the kick panels. In general, such installations were convenient and provided certain advantages over the factory supplied speaker. The location of the speakers at the outermost perimeter of the automobile and adjacent to the passengers provided the maximum in stereophonic effect. Also, placing the kick panels under the dashboard makes the speaker retained therein easily accessible for running wiring from a radio located in the dashboard.

The installation of speakers in kick panels can also be problematic. The installer is confronted with several limitations that restrict the choice of speakers which may be installed. The depth of the audio speaker that may be used is limited by the distance from the surface of the kick panel to the outside wall of front fender of the automobile. In most cases this dimension is about one to one and one fourth inches. This limitation, in turn, restricts the diameter of the speaker cone. In many cases the size of the cone becomes limited to a diameter of four inches which results in poor sound quality. To overcome this problem owners may purchase larger, specially shaped, speakers that produce better sound. In addition to the increased cost, these speakers can cause a new problem: the fresh air vent must be sacrificed or moved to a different location.

SUMMARY OF THE INVENTION

The present invention relates to a kick panel for a vehicle and for mounting large, high quality speakers with superior sound qualities and for making it possible to retain fresh air vents in their original locations. Therefore, the object of the invention is to provide a kick panel that can accommodate the mounting of large size speakers.

Another object of this invention is to provide a superior sound chamber for containing a large size speaker that avoids excessive vibration of the speaker's cone by maintaining proper acoustic loading.

Another object of the invention is to provide a mount for large size speakers in the kick panel of an vehicle and at the same time retain the fresh air vents in their original locations.

According to the present invention, the kick panel is made with a speaker mount which rises above the surface of the panel having a central opening therein. The speaker mounting surface consists of an annular rim which extends partially over the central opening. More specifically, the width of the annular rim is sufficient to support the mounting perimeter of a speaker, and yet not so wide as to interfere with the operation of the speaker. In addition, the invention includes a plurality of louvers adjacent to the top edge of the mount for allowing the free flow of fresh air into the passenger compartment. The cut of the louver openings is specially selected so that some of the air is directed toward the passenger and some of the air is directed downward toward the floor.

In use, the base member is installed in place of the standard kick panel which is provided with an automobile. Wiring from one audio channel of the radio or other audio equipment is routed to the opening between the base member and the outside wall of the automobile. A speaker is then mounted on the annular rim after the removal of any felt installation material that would interfere with the speaker's magnet, and wiring is connected to the speaker's terminals.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
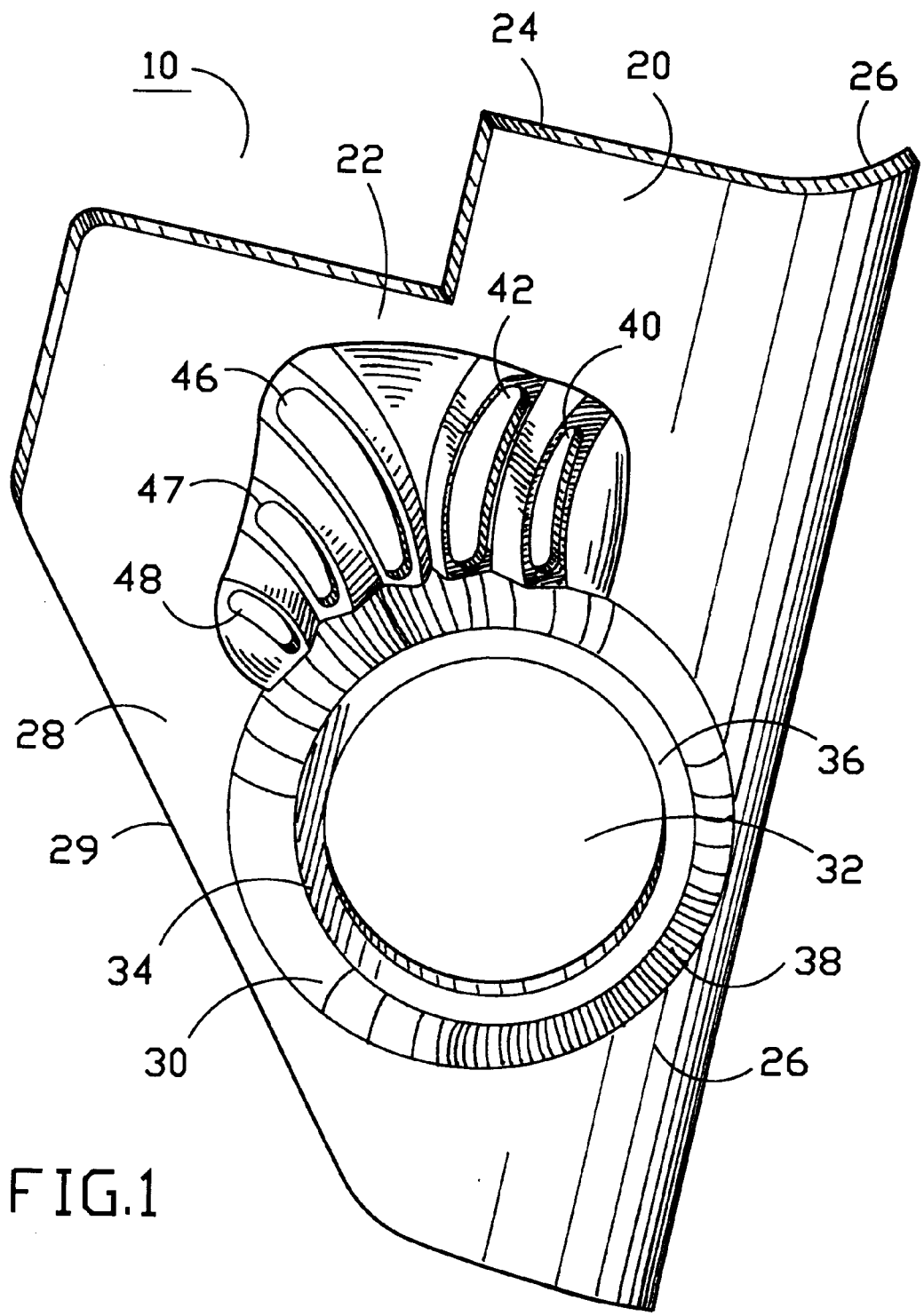
FIG. 1 is a perspective view of a presently preferred form of the new automobile speaker mounting and venting device.

Referring now to the drawings, FIG. 1 is a perspective view of the preferred form of the novel kick panel. The kick panel 10 includes a base member 20 with a raised area or mound 30 in the lower portion 28. Mound 30 is formed with a central opening 32 for accommodating an audio speaker. In the upper portion 22 of base member 20 are a plurality of louvers 40, 42, 46, 47 and 48 formed into base member 20 which act as fresh air vents.

More specifically, base member 20 is of a generally flat configuration with an overall thickness of approximately one-sixteenth of an inch. It is typically constructed of a rigid plastic material and formed as a singular integral piece to duplicate the shape of a kick panel that would come as standard equipment on a particular model of automobile. Kick panel 10, shown in FIG. 1, is designed to replace the passenger side kick panel in a 1955 Chevrolet. It has a curved right hand edge 26 which is designed to meet the molding which surrounds the opening for the passenger side door. Upper edge 24 is cut to fit around various components under the dashboard of that particular model of automobile. Floor edge 29 is configured to follow the upward slope of the floor board at the point it meets the outer wall of the passenger compartment.

In lower portion 28 of base member 20 is a raised portion or mound 30. In FIG. 1 mound 30 has a central opening 32 which is formed therein as part of base member 20. In the preferred embodiment of the invention, mound 30 has an annular mounting rim 34 for supporting the edge of an audio speaker. Mounting rim 34 must be of sufficient width to accommodate the attachment means commonly used in the mounting of such speakers. The height of mounting rim 34 above base member 20 is also important. The more desirable speakers for automobiles are larger in diameter as well as in depth. In order to accommodate this increased depth, mounting rim 34 must be well above base member 20. In the preferred embodiment the height of the mounting rim 34 is about two inches above the surface of base member 20.

In upper portion 22 of base member 20 there is shown a plurality of integrally formed louvers 40, 42, 46, 47 and 48 for providing fresh air ventilation to the passenger compartment. Louvers 40 and 42 are configured so as to direct the air flow from the automobile's standard ventilation system over the top of mound 30 and directly toward the passenger. Louvers 46, 47 and 48 also gather some of the fresh air from the ventilation system but are designed to direct the air flow downward to the floor of the automobile. In this way the raised portion of base member 30 is not inhibiting the free and balanced flow of fresh air into the passenger compartment.

Figure 2:
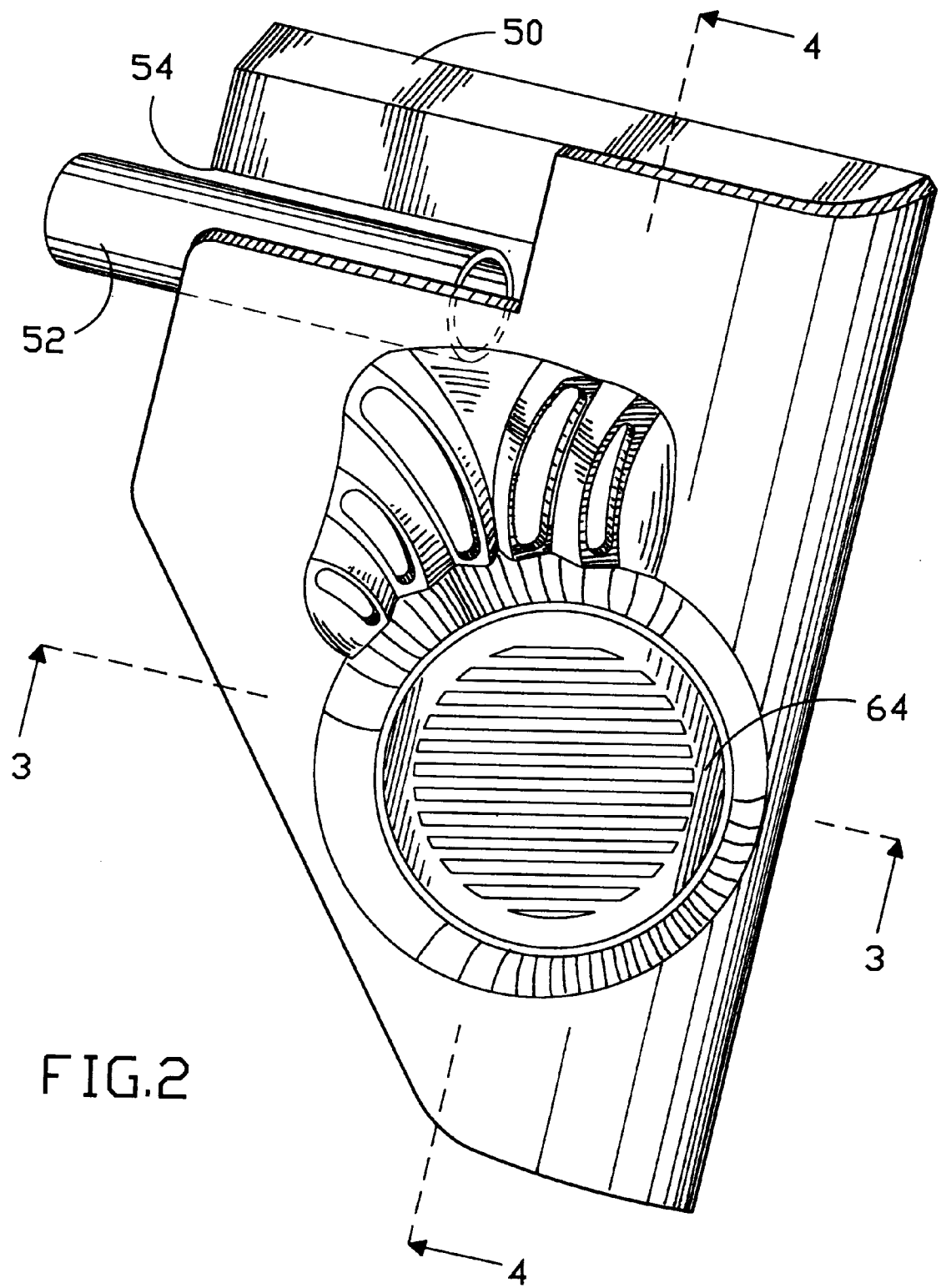
FIG. 2 is a perspective view of the preferred form of the invention in use as a passenger kick panel.

In FIG. 2 there is shown a preferred embodiment of the invention after it has been installed in an automobile. As can be seen, base member 20 has been installed over two standard components of an automobile, a sound deadener or heavy felt pad 50 and a ventilation duct 52. It is standard in automobile assembly to have felt pad 50 covering the entire area between the kick panel and the front fender. However, portions of felt pad 50 are cut away in order to accommodate a ventilation plenum, such as duct 52. In FIG. 2 pad 50 is shown cut away at 54. In general felt pads have a thickness of approximately one inch. In the prior art the installer would remove a portion of the pad in order to insert the rear portion of a speaker. This normally would leave a cavity of about one inch in depth, thereby prohibiting the installation of any speakers with a greater depth. Even more problematic, the air space surrounding the rear of the speaker would be severely limited or non-existent. Oftentimes, an installer removes a section of the pad sufficient to accommodate the magnet of a speaker. The area of the felt pad surrounding the magnet presses against the rear of the speaker frame and cone, thereby preventing the formation of a proper sound chamber which is necessary for maintaining a proper acoustic load on the cone of the speaker.

Figure 3:
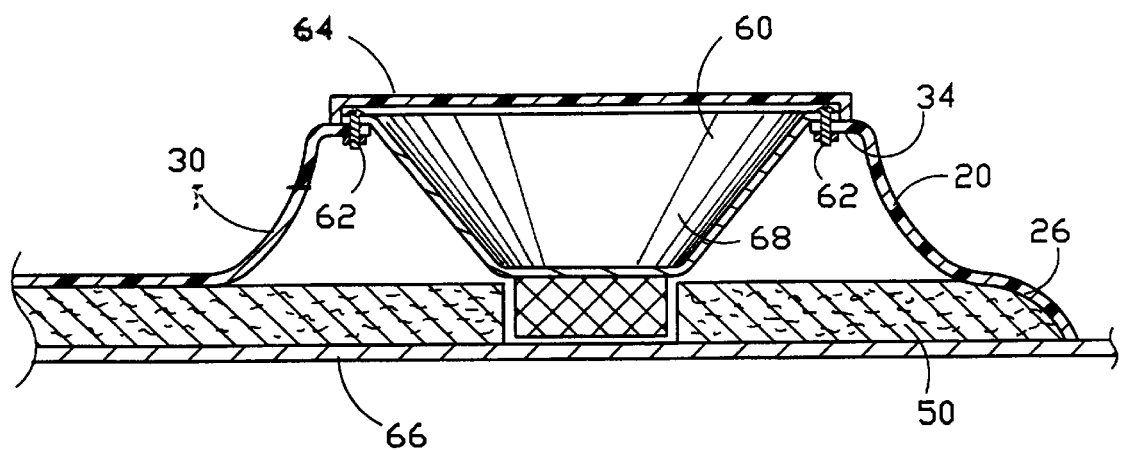
FIG. 3 is a cross-sectional view taken on line 3—3 of FIG. 2.
Figure 4:
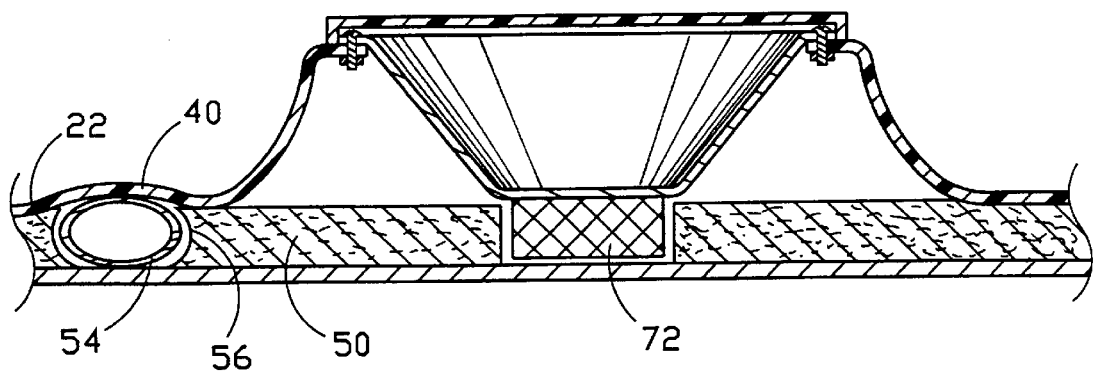
FIG. 4 is a side elevational view, in cross-section, taken on line 4—4 of FIG. 2.

In FIGS. 2, 3 and 4 the speaker 60 has been installed on mounting rim 34 with fasteners 62. A protective grill 64 has been installed on the face of speaker 60. Shown in FIG. 3 is the preferred embodiment of the invention supporting a large speaker an increased distance from the front fender 66 of the automobile. It can be readily seen that cone 68 of speaker 60 is now encompassed within an acoustic chamber. In the preferred embodiment, the height of acoustic chamber 70 is approximately two inches with an inner diameter at the speaker end of six and one-half inches and an outer diameter at the felt pad end of eight and one-half inches.

FIG. 4 shows a cross-section of the preferred embodiment and the associated fresh air ventilation system. In upper portion 22 a ventilation duct 52 feeds fresh air into louver 40 and therethrough into the passenger compartment. FIG. 4 also illustrates the manner in which the felt pad has been removed at point 56 in order to accommodate the speaker's magnet 72.

Defined in detail, in a vehicle having a stereo sound system with a speaker wired to a driver side inner wall area wherein the area contains a fresh air duct and sound insulation and a speaker wired to the passenger side inner wall area wherein the area contains a fresh air duct and sound insulation, the present invention is a kick panel for the driver side and a kick panel for the passenger side, each kick panel comprising: (a) a retrofittable kick panel for providing a speaker mounting surface and a sound chamber for an audio speaker and for providing for fresh air access to the interior of the vehicle; (b) a plate like base member being constructed of a rigid material with an air access section and a speaker mounting section, the plate like member being adapted to be fitted over the inner wall insulation in place of an original kick panel; (c) the speaker section having a round mound which rises above the surface of the plate like base member and which has a substantially flat topside with an opening surrounded by an annular mounting rim for receiving and securing an audio speaker; and (d) the plate like base member including an air access section having a plurality of louver openings for receiving fresh air from the air duct, the plurality of louver openings located adjacent to the round mound with some of the louver openings configured to direct air upwardly into the passenger compartment of the vehicle and some of the louver openings configured to direct air toward the floor of the vehicle.

Defined broadly, in a vehicle having a stereo sound system with a speaker wired to a driver side inner wall area wherein the area contains a fresh air duct and sound insulation and a speaker wired to the passenger side inner wall area wherein the area contains a fresh air duct and sound insulation, the present invention is a kick panel for the driver side and a kick panel for the passenger side, each kick panel comprising: (a) a retrofittable panel for providing a speaker mounting surface and a sound chamber for an audio speaker and for providing for fresh air access to the interior of the vehicle; (b) a plate like base member being constructed of a rigid material with an air access section and a speaker mounting section, the plate like base member being adapted to be fitted over the inner wall insulation in place of an original kick panel; (c) the air access section having plurality of openings for receiving fresh air from the air duct; and (d) the speaker section having a mound, wherein the mound has a substantially flat top side with an opening for receiving and securing an audio speaker.

Defined alternatively broadly, in a vehicle having a stereo sound system with left and right speakers, areas to mount driver's side and passenger side kick panels and a pair of fresh air ducts terminating under the dashboard near the driver's side kick panel area and the passenger's side kick panel area, the present invention is a kick panel for the driver side and the passenger side comprising: (a) a retrofittable kick panel for providing a speaker mounting surface and sound chamber for large size audio speakers and for providing for fresh air access to the interior of the automobile; (b) a base member constructed of a rigid material with an upper portion and a lower portion; (c) the base member upper portion having a plurality of openings for providing access for fresh air flow into the interior of the automobile; and (d) the lower portion having a raised area, wherein the raised area has a substantially flat topside with an opening which is surrounded by a means to mount an audio speaker.

Defined further alternatively broadly, the present invention is a kick panel for a vehicle comprising: (a) a base member constructed of a rigid material with an upper portion and a lower portion; (b) the base member upper portion having a plurality of openings for providing fresh air flow to the passenger compartment of the automobile; and (c) the lower portion having a convex area, wherein the convex area has a substantially flat topside having an opening defined by a speaker mounting means.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to disclose all the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent monopoly to be granted.

What is claimed is:

1. In a vehicle having a stereo sound system with a speaker wired to a driver side inner wall area wherein said area contains a fresh air duct and sound insulation and a speaker wired to the passenger side inner wall area wherein said area contains a fresh air duct and sound insulation, a kick panel for the driver side and a kick panel for the passenger side, each kick panel comprising:
   a. a retrofittable panel for providing a speaker mounting surface and a sound chamber for an audio speaker and for providing for fresh air access to an interior of said vehicle;
   b. a plate like base member being constructed of a rigid material with an air access section and a speaker mounting section, said plate like member being adapted to be fitted over said sound insulation in place of an original kick panel;
   c. said speaker section having a round mound which rises above the surface of the plate like base member and which has a substantially flat topside with an opening surrounded by an annular mounting rim for receiving and securing the speaker; and
   d. said plate like base member including an air access section having a plurality of louver openings for receiving fresh air from said air duct, the plurality of louver openings located adjacent to said round mound with some of the louver openings configured to direct air upwardly into the passenger compartment of the vehicle and some of the louver openings configured to direct air toward the floor of the vehicle.

2. The invention as defined in claim 1 wherein said air access further comprises two louver openings for directing air upwardly into the passenger compartment and three louver openings for directing air toward a floor of the vehicle.

3. The invention as defined in claim 1 wherein said round mound has a diameter of at least five inches.

4. The invention as defined in claim 1 wherein the top side of said mound is at a distance of at least two inches from said insulation.

5. In a vehicle having a stereo sound system with a speaker wired to a driver side inner wall area wherein said area contains a fresh air duct and sound insulation and a speaker wired to the passenger side inner wall area wherein said area contains a fresh air duct and sound insulation, a kick panel for the driver side and a kick panel for the passenger side, each kick panel comprising:
   a. a retrofittable panel for providing a speaker mounting surface and a sound chamber for the and for providing for fresh air access to an interior of said vehicle;
   b. a plate like base member being constructed of a rigid material with an air access section and a speaker mounting section, said plate like base member being adapted to be fitted over said sound insulation in place of an original kick panel;
   c. said air access section having plurality of openings for receiving fresh air from said air duct; and
   d. said speaker section having a mound, wherein said mound has a substantially flat top side with an opening for receiving and securing the speaker.

6. The invention as defined in claim 5 wherein said air access section contains five openings for receiving fresh air from said ducts.

7. The invention as defined in claim 6 wherein said five openings are in the form of louvers.

8. The invention as defined in claim 5 wherein said opening in said mount is round and has a diameter of at least five inches.

9. The invention as defined in claim 5 wherein said opening is surrounded by an annular mounting rim.

10. The invention as defined in claim 5 wherein said top side of said mound is at a distance of at least two inches from said insulation.

11. In a vehicle having a stereo sound system with left and right large size audio speakers, areas to mount driver's side and passenger side kick panels and a pair of fresh air ducts respectively terminating under the dashboard near the driver's side kick panel area and the passenger's side kick panel area, a kick panel for the driver side and a kick panel for the passenger side, each kick panel comprising:
   a. a retrofittable panel for providing a speaker mounting surface and sound chamber for large size audio speakers and for providing for fresh air access to an interior of said automobile;
   b. a base member constructed of a rigid material with an upper portion and a lower portion;
   c. said base member upper portion having a plurality of openings for providing access for fresh air flow into said interior of said automobile; and
   d. said lower portion having a raised area, wherein said raised area has a substantially flat topside with an opening which is surrounded by a means to mount an audio speaker.

12. The invention as defined in claim 11 wherein said air access section contains five openings for receiving fresh air from said ducts.

13. The invention as defined in claim 12 wherein said five openings are in the form of louvers.

14. The invention as defined in claim 11 wherein said opening in said raised area is circular with a diameter of at least five inches.

15. The invention as defined in claim 11 wherein said speaker mounting means is an annular rim.

16. The invention as defined in claim 11 wherein said topside of said raised area is at a distance of at least two inches from said insulation.

17. A kick panel for a vehicle comprising:

a. a base member constructed of a rigid material with an upper portion and a lower portion;

b. said base member upper portion having a plurality of openings for providing fresh air flow to a passenger compartment of said vehicle; and c. said lower portion having a convex area, wherein said convex area has a substantially flat topside having an opening defined by a speaker mounting means.

18. The invention as defined in claim 17 wherein said air access section contains five openings for receiving fresh air from said ducts.

19. The invention as defined in claim 18 wherein said five openings are in the form of louvers.

20. The invention as defined in claim 17 wherein said opening in said convex area has a diameter of at least five inches.

21. The invention as defined in claim 17 wherein said mounting means is a rim.

22. The invention as defined in claim 17 wherein said topside of said convex area is at a distance of at least two inches from said insulation.

* * * * *